(12) United States Patent
Matsui

(10) Patent No.: US 8,054,457 B2
(45) Date of Patent: Nov. 8, 2011

(54) LIGHT INTENSITY DETECTING METHODS AND DEVICES, DISPLAY DEVICES AND STORAGE MEDIA

(75) Inventor: Yoshikazu Matsui, Kobe (JP)

(73) Assignee: Chimei Innolux Corporation, Chu-Nan (TW)

( * ) Notice: Subject to any disclaimer, the term of this patent is extended or adjusted under 35 U.S.C. 154(b) by 279 days.

(21) Appl. No.: 12/473,197

(22) Filed: May 27, 2009

(65) Prior Publication Data
US 2009/0296078 A1 Dec. 3, 2009

(30) Foreign Application Priority Data
May 27, 2008 (JP) ................................ 2008-138547

(51) Int. Cl.
*G01J 1/02* (2006.01)
(52) U.S. Cl. .................. 356/213; 250/205; 250/214 DC
(58) Field of Classification Search .................. 356/213; 250/205, 214 L, 142 DC; 327/35–38, 175; 340/461, 995
See application file for complete search history.

(56) References Cited

U.S. PATENT DOCUMENTS

| 4,958,707 A * | 9/1990 | Yoneda et al. ................. 187/247 |
| 5,289,167 A * | 2/1994 | Kurosawa et al. ............. 340/461 |
| 5,376,992 A * | 12/1994 | Hasegawa et al. ............. 396/229 |
| 5,479,118 A * | 12/1995 | Niijima ............................ 327/38 |
| 6,456,134 B2 * | 9/2002 | Niijima .......................... 327/175 |
| 7,075,047 B2 * | 7/2006 | Noguchi et al. ............... 250/205 |

FOREIGN PATENT DOCUMENTS

| JP | 2001-027656 | 1/2001 |
| JP | 2001-522058 | 11/2001 |
| JP | 2005-345286 | 12/2005 |
| JP | 2007-256057 | 10/2007 |

* cited by examiner

*Primary Examiner* — Sang Nguyen
(74) *Attorney, Agent, or Firm* — Liu & Liu (57) ABSTRACT

A light intensity detecting device is provided to detect a light intensity according to pulse duration of a pulse signal without being affected by noise, including: a time measuring unit for measuring an elapsed time period of the pulse signal that has been raised; a signal state discriminating unit for obtaining a state of the pulse signal; a sampling unit for directing the signal state discriminating unit to obtain the state at a sampling interval corresponding to the elapsed time period; and a falling detecting unit for detecting the pulse signal that has been fallen when a fallen state of the pulse signal is successively obtained for two times. When the fallen pulse signal is detected, the sampling unit directs the signal state discriminating unit to obtain the state of the pulse signal at a time point, which is output as the pulse duration of the pulse signal.

18 Claims, 7 Drawing Sheets

| Elapsed time period of the raised pulse signal t [Second] | Sampling Frequency f [Hz] |
| --- | --- |
| $0 \leq t < a$ | $10 \times 10^6$ |
| $a \leq t < b$ | $2.5 \times 10^6$ |
| $b \leq t < c$ | $635 \times 10^3$ |
| $c \leq t$ | $156.25 \times 10^3$ |

LIGHT INTENSITY DETECTING METHODS AND DEVICES, DISPLAY DEVICES AND STORAGE MEDIA

CROSS REFERENCE TO RELATED APPLICATIONS

This application claims priority of Japan Patent Application No. 2008-138547, filed on May 27, 2008, the entirety of which is incorporated by reference herein.

BACKGROUND OF THE INVENTION

1. Field of the Invention

The invention relates to light intensity detecting methods and devices, and display devices and storage media using the same, detecting light intensity according to pulse duration of a pulse signal output from a light sensor.

2. Description of the Related Art

Methods for adjusting display illumination according to environmental light intensity and devices thereof are applied in vehicle and portable display devices. For example, Japanese Patent Application Laid-Open No. 2001-522058 discloses a display device with an illumination controller for adjusting display illumination according to environmental light intensity detected by a light sensor. Thus, the illumination from the display device is accordingly increased during the day or in a bright environment, and decreased during the night or in a dark environment.

Figure 7:
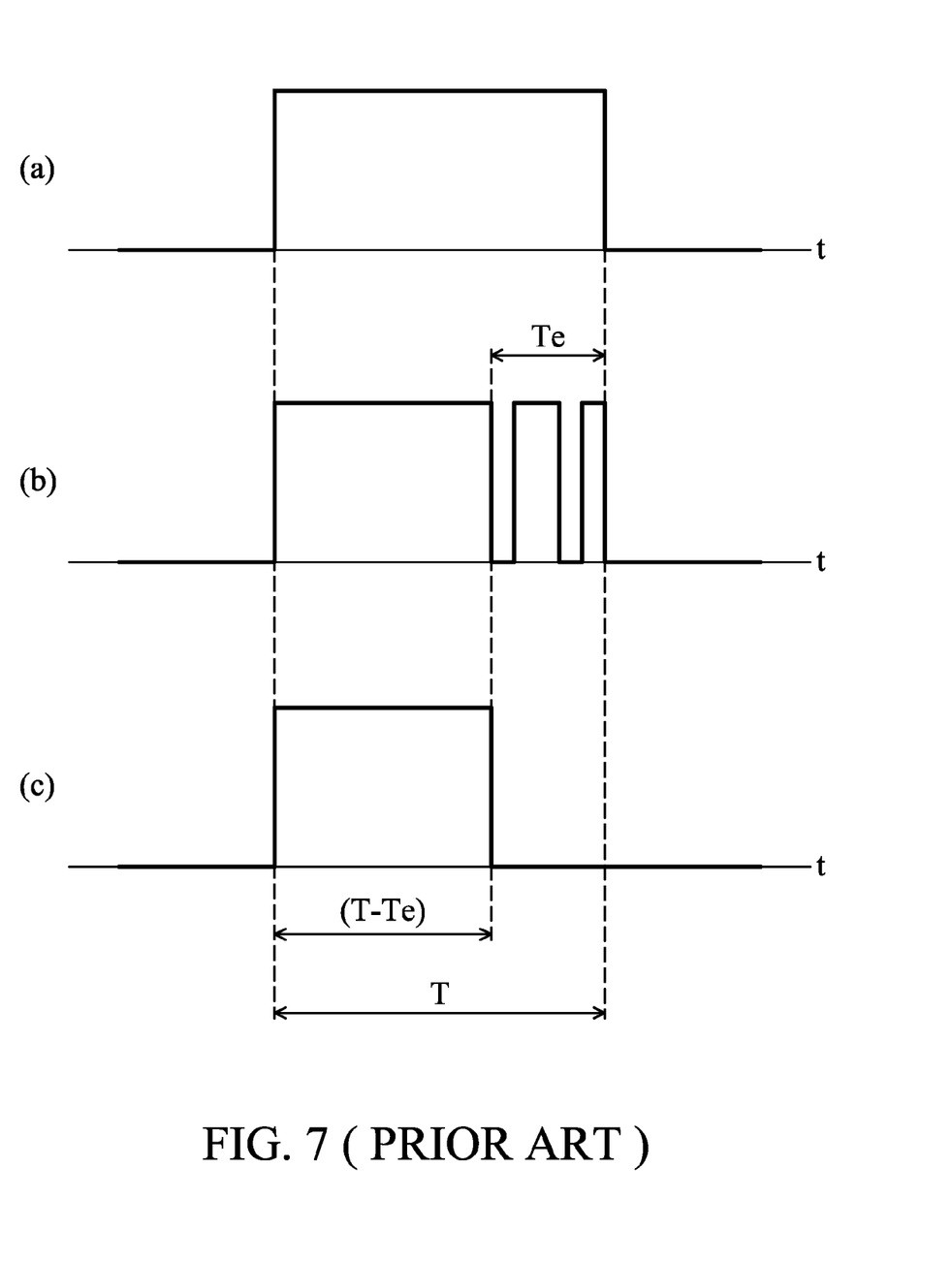
FIG. 7 illustrates pulse duration of a pulse signal detected by the prior art.

Generally, a light sensor for detecting environmental light generates an output signal according to the intensity of the received light. The output signal as shown in FIG. 7(a) is one single pulse signal. As the intensity of the received light increases, a width T of the pulse signal decreases. In other words, the brighter the environmental light is, the shorter the width of the pulse signal output from the light sensor is. For example, a light sensor is disclosed in Japanese Patent Application Publication No. 2005-345286. In order to detect environmental light intensity, the width T of the pulse signal output from the light sensor where the environmental light has been received is measured. However, as shown in FIG. 7(b), the light sensor is unable to operate normally due to external noises, such that an error may exist in the pulse signal output from the light sensor. Specifically, when the environmental light is dark and the light intensity received by the light sensor is relatively weak, an error is more likely to occur. This is because the pulse duration of the pulse signal output from the light sensor is relatively wider when the environmental light is dark. Specifically, according to the prior art as shown in FIG. 7(c), an error period Te is discarded, and the environmental light intensity is determined by the remaining period (T-Te). As a result, the environmental light intensity determined by discarding the error duration, compared with the measured value, has an approximate 10% error therein.

Therefore, it is desired to provide light intensity detecting methods and devices, and display devices and storage media using the same, detecting light intensity according to pulse duration of a pulse signal output from a light sensor without being affected by noise.

BRIEF SUMMARY OF THE INVENTION

The invention provides a light intensity detecting device, detecting a light intensity according to pulse duration of a pulse signal output from a light sensor. The light intensity detecting device comprises a time measuring unit, a signal state discriminating unit, a sampling unit and a falling detecting unit. The time measuring unit measures an elapsed time period of the pulse signal that has been raised. The signal state discriminating unit obtains a state of the pulse signal. The sampling unit directs the signal state discriminating unit to obtain the state of the pulse signal at a sampling interval. The sampling interval corresponds to the elapsed time period of the raised pulse signal measured by the time measuring unit. The falling detecting unit detects the pulse signal that has been fallen when the signal state discriminating unit successively obtains a fallen state of the pulse signal for two times. When the falling detecting unit detects the fallen pulse signal, the sampling unit directs the signal state discriminating unit to obtain the state of the pulse signal at a time point and outputs the time point as the pulse duration of the pulse signal.

The invention also provides a display device comprising the aforementioned light intensity detecting device.

In addition, the invention provides a light intensity detecting method, detecting a light intensity according to pulse duration of a pulse signal output from a light sensor. The method comprises the steps of: measuring an elapsed time period of the pulse signal that has been raised; obtaining a state of the pulse signal at a sampling interval, wherein the sampling interval corresponds to the elapsed time period of the raised pulse signal; detecting the pulse signal that has been fallen when a fallen state of the pulse signal is successively obtained for two times; and outputting a time point as the pulse duration of the pulse signal, wherein the state of the pulse signal is obtained at the time point in response to detecting the fallen pulse signal.

As a result, the invention provides a light intensity detecting method without being affected by noise according the pulse duration of the pulse signal output from the light sensor.

Further, the invention provides a computer-readable storage medium for storing a light intensity detecting program. The light intensity detecting program operates a computer to detect the light intensity according to pulse duration of a pulse signal output from a light sensor. The light intensity detecting program comprises using the computer to perform the steps of the aforementioned light intensity detecting method.

The light intensity detecting program is stored in the computer-readable storage medium. Additionally, the light intensity detecting program may be also externally accessed through the network when the computer is connected to a network, such as an internet.

As a result, the invention provides light intensity detecting methods and devices, and display devices and storage media using the same, detecting light intensity according to pulse duration of a pulse signal output from a light sensor without being affected by noise.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
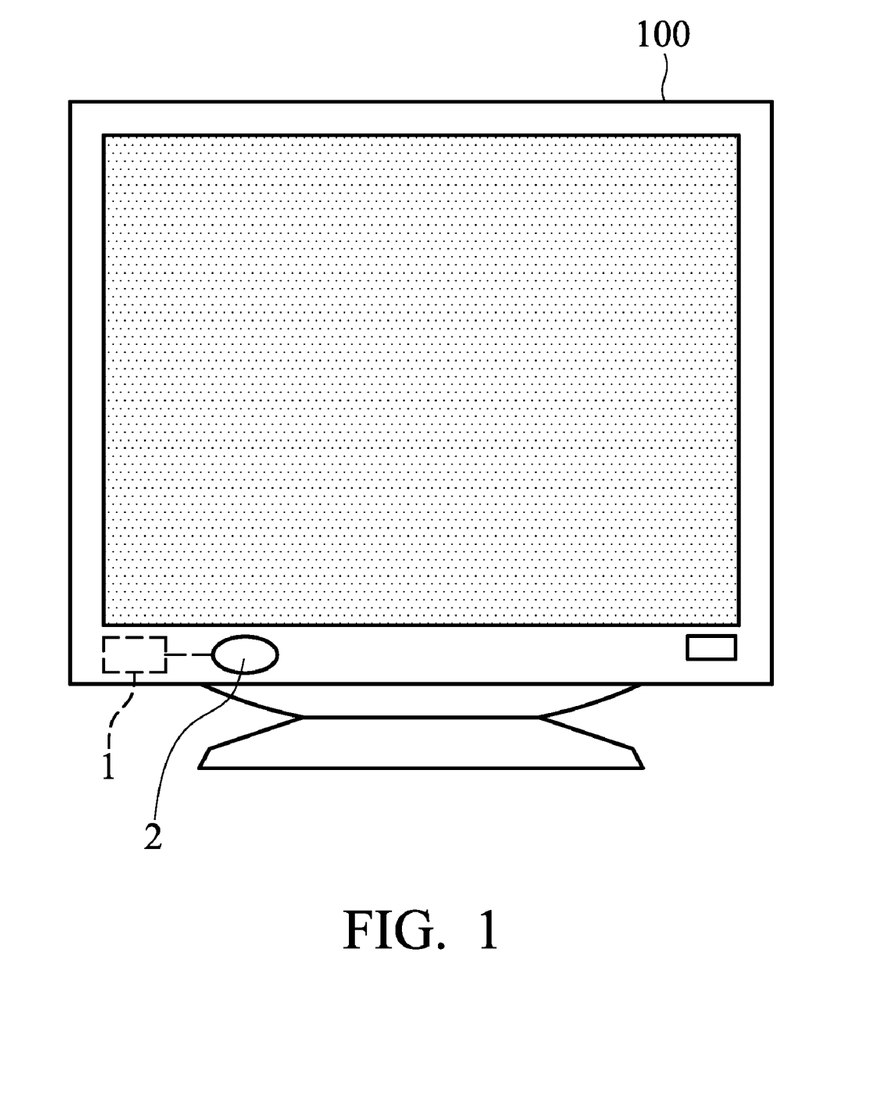
FIG. 1 is a diagram illustrating a front view of a light intensity detecting device, detecting a light intensity according to the invention.

FIG. 1 is a diagram illustrating a front view of a light intensity detecting device, detecting a light intensity according to the invention.

As shown in FIG. 1, a light intensity detecting device 1 according to the invention, for example, is equipped inside the chassis of a screen of a display device 100. The display device 100 further comprises a light sensor 2, which receives an environmental light and outputs a pulse signal with a pulse width corresponding to the light intensity. The light intensity detecting device 1 is used for detecting the light intensity according to pulse duration of the pulse signal output from the light sensor 2. Thus, the display illumination of the display device 100 may be adjusted corresponding to the light intensity detected by the light intensity detecting device 1. For example, when an image is displayed on the screen of the display device 100, the display illumination is correspondingly increased during the day or in a bright outdoor environment, and decreased during the night or in a dark indoor environment. . . .

Figure 2:
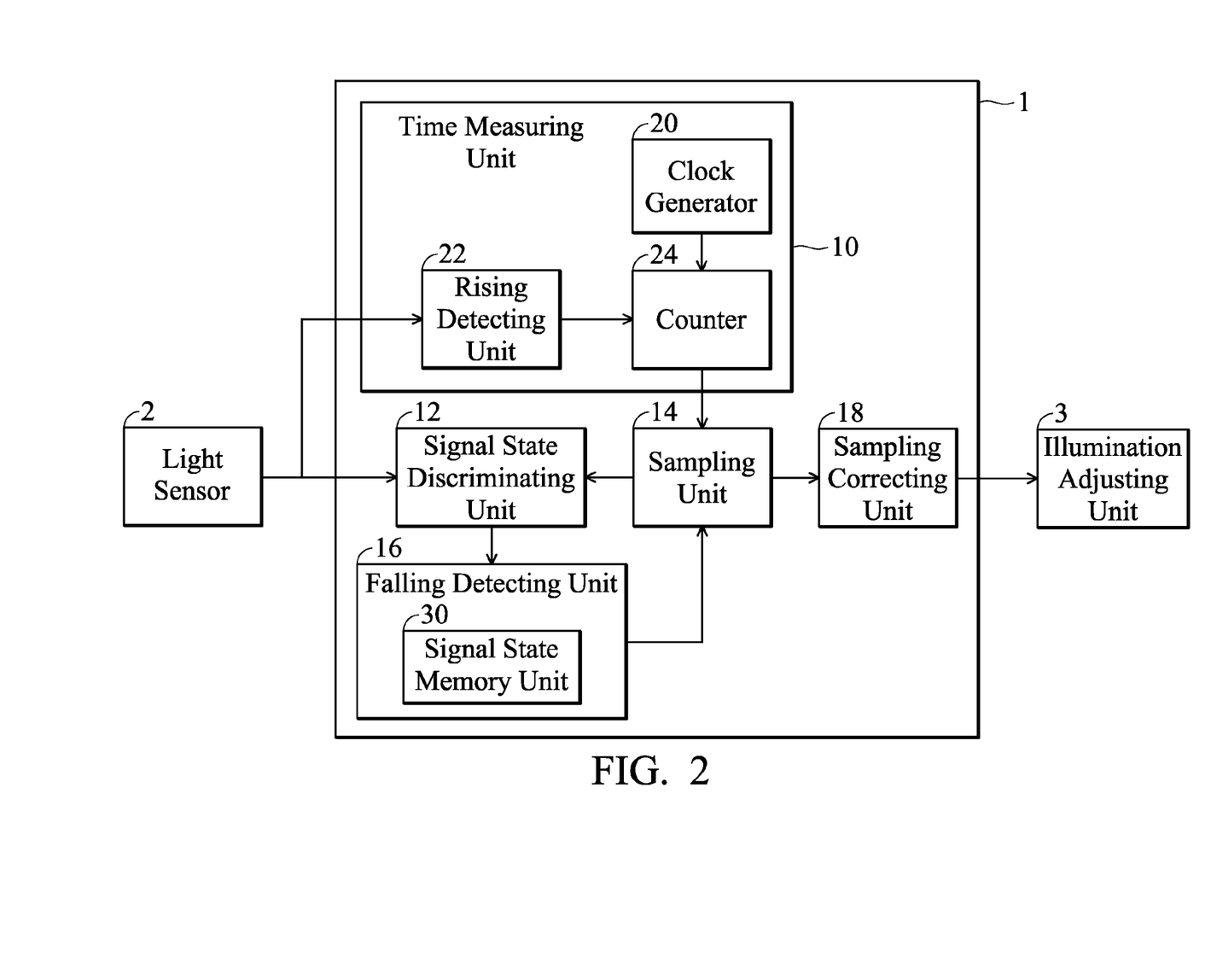
FIG. 2 is a block diagram illustrating a light intensity detecting device, detecting a light intensity according to the invention.

FIG. 2 is a block diagram illustrating a light intensity detecting device, detecting a light intensity according to the invention.

As shown in FIG. 2, the light intensity detecting device 1 comprises: a time measuring unit 10 for measuring an elapsed time period of a pulse signal, which has been raised, output from the light sensor 2; a signal state discriminating unit 12 for obtaining a state of the pulse signal (i.e. a high level (H) or a low level (L)); a sampling unit 14 for directing the signal state discriminating unit 12 to obtain the state of the pulse signal at a sampling interval, which corresponds to the elapsed time period of the raised pulse signal measured by the time measuring unit 10; and a falling detecting unit 16 for detecting the pulse signal that has been fallen when the signal state discriminating unit 12 successively obtains a low level of the pulse signal for two times. When the falling detecting unit 16 detects the fallen pulse signal, the sampling unit 14 directs the signal state discriminating unit 12 to obtain the state of the pulse signal at a time point and outputs the time point as the pulse duration of the pulse signal. The light intensity detecting device 1 further comprises a sampling correcting unit 18 for multiplying a reciprocal of the pulse duration of the pulse signal output from the sampling unit 14 with a predetermined constant, thereby correcting the pulse duration of the pulse signal. The sampling correcting unit 18 corrects the pulse duration of the pulse signal and provides corresponding information to an illumination adjusting unit 3 for adjusting display illumination of the display according to the pulse duration.

The time measuring unit 10 comprises a clock generator 20 to oscillate with a predetermined clock frequency, a rising detecting unit 22 for detecting the pulse signal, which has been raised, output from the light sensor 2, and a counter 24, activated to count the clock of the clock generator 20 when the rising detecting unit 22 detects the raised pulse signal. The clock generator 20, for example, oscillates with an oscillating frequency 10 MHz. When the raised pulse signal output from the light sensor 2 is detected by the rising detecting unit 22, the counter 24 is activated to count by 10 MHz. As a result, the time measuring unit 10 is capable of measuring the elapsed time period of the raised pulse signal output from the light sensor 2.

Figure 3:
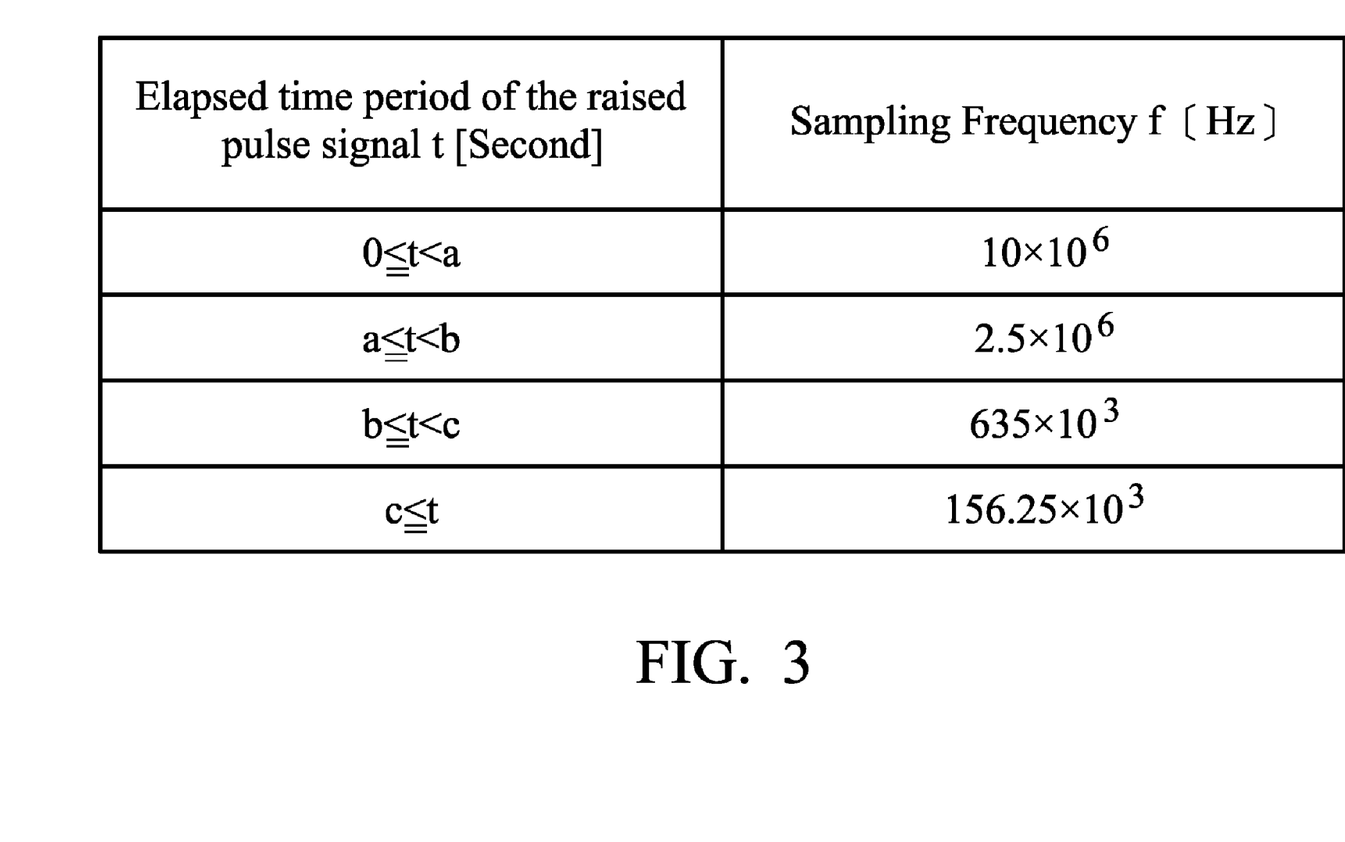
FIG. 3 is a mapping table illustrating an elapsed time period of the pulse signal that has been raised and a corresponding sampling interval.

The sampling unit 14 confirms a counting value of the counter 24, thereby obtaining the elapsed time period of the raised pulse signal output from the light sensor 2. In addition, the sampling unit 14 directs the signal state discriminating unit 12 to obtain the state (H/L) of the pulse signal at a sampling interval corresponding to the elapsed time period. The sampling unit 14 comprises a mapping table as shown in FIG. 3. The mapping table illustrates an elapsed time period of the raised pulse signal and a corresponding sampling interval. For example, as shown in FIG. 3: when the elapsed time period t (unit:second) matches 0t<a, the sampling frequency f is 10 MHz; when the elapsed time period t matches a t<b, the sampling frequency f is 2.5 MHz; when the elapsed time period t matches b t<c, the sampling frequency f is 635 KHz; and when the elapsed time period t matches c t, the sampling frequency f is 156.25 KHz. Therefore, the sampling unit 14 may extend the sampling interval (1/f) according to the time period measured by the time measuring unit 10.

In addition, according to the sampling interval (1/f), the elapsed time period t from the raised pulse signal corresponding to the sampling interval, and a count N for the signal state discriminating unit 12 to obtain the state of the pulse signal according to the sampling interval, the sampling unit 14 determines a time point T1 as the pulse duration of the pulse signal when the sampling unit 14 directs the signal state discriminating unit 12 to obtain the state of the pulse signal. The pulse duration of the pulse signal is determined according to the following formula:

$$T1 = \text{elapsed time period } t + (1/f) \times N$$

The signal state discriminating unit 12 obtains the state (H/L) of the pulse signal output from the light sensor 2 when directed by the sampling unit 14. Further, the falling detecting unit 16 detects the fallen pulse signal when the signal state discriminating unit 12 successively obtains a low level of the pulse signal for two times. In other words, the falling detecting unit 16 assures a fallen state of the pulse signal. Thus, the falling detecting unit 16 comprises a signal state memory unit 30 for storing at least a first previous state of the pulse signal and a second previous state preceding the first previous state of the pulse signal, both are obtained by the signal state discriminating unit 12. Specifically, since the state of the pulse signal is either a high level (H) or a low level (L), at least two 1-bit registers are provided for meeting the requirement of the falling detecting 16.

When the falling detecting unit 16 detects the fallen pulse signal, i.e. the states of the pulse signal are sequentially obtained as "HLL", the falling detecting unit 16 accordingly notifies the sampling unit 14. In response to the notification, the sampling unit 14 outputs the pulse duration of the pulse signal T1, which is determined according to the aforementioned formula.

However, assuming that the states of the pulse signal are sequentially "HLL", because the time T1 represents the time point for obtaining the last low level state (L), compared with the actual pulse duration T of the pulse signal, a maximum error of 2×(1/f) second is reached.

To compensate for such error, the sampling correcting unit 18 multiplies the reciprocal of the pulse duration of the pulse signal T1 from the sampling unit 14 with a predetermined constant X. The constant X is determined according to the specification of the illumination adjusting unit 3 and the value thereof is chosen to maintain the relationship between a value corresponding to the pulse signal output from the light sensor 2 and the actual environmental light intensity, thereby adjusting a resolution of the output data output from the light intensity detecting device 1. The constant X may be a fixed value preset in the device, or be chosen among several values by a user.

When the environmental light is brighter, the pulse duration of the pulse signal output from the light sensor 2 is shorter and then the sampling correcting unit 18 outputs a larger value. Further, when environmental light is darker, a smaller value is correspondingly output by the sampling correcting unit 18.

A detailed description of the operation of the light intensity detecting device is given below with reference to FIG. 2.

Figure 4:
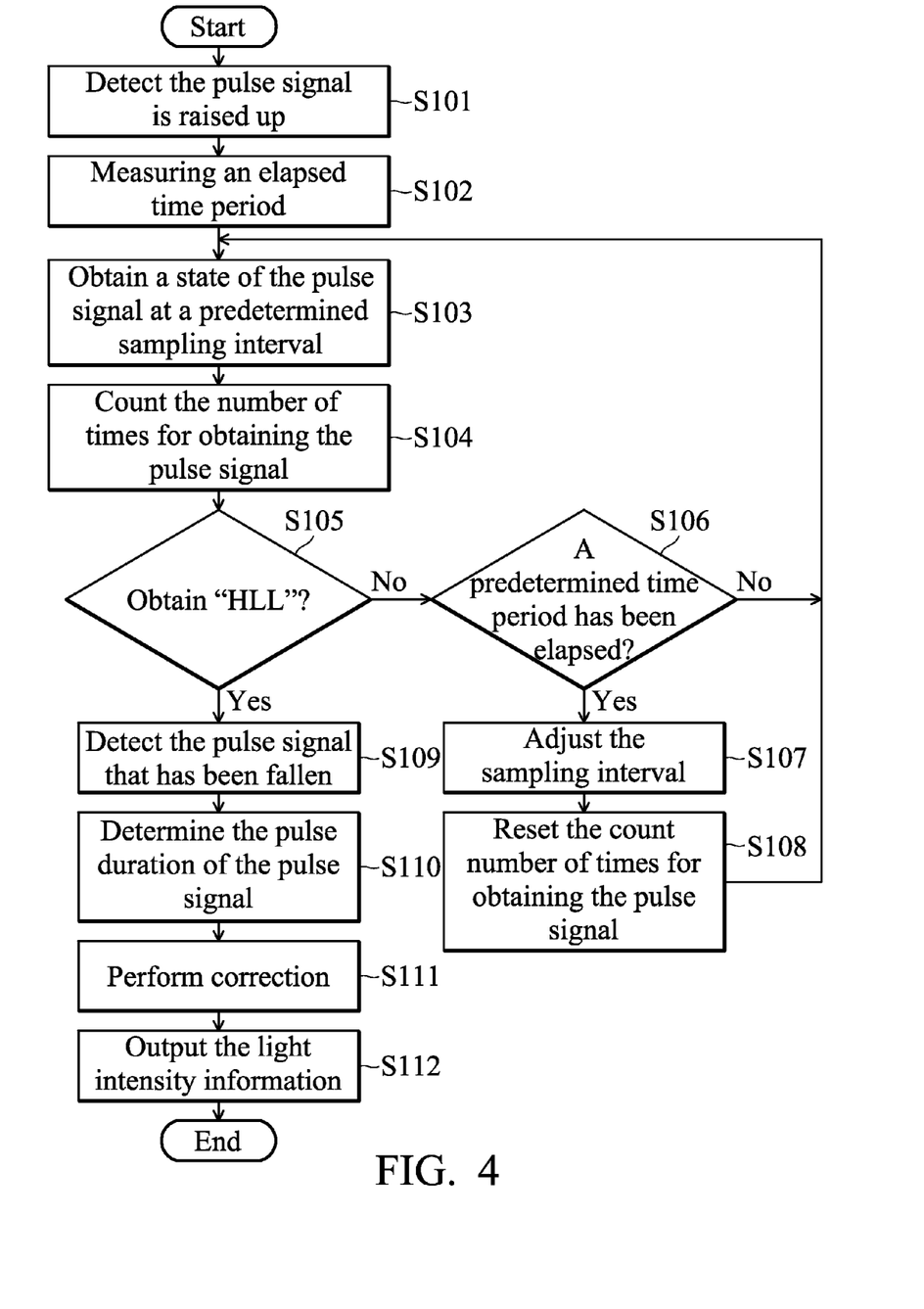
FIG. 4 is a flow chart illustrating the operation of detecting light intensity according to a light intensity detecting device of the invention.

FIG. 4 is a flow chart illustrating the operation of detecting light intensity according to a light intensity detecting device 1 as shown in FIG. 2.

First, a light sensor 2 receives an environmental light and outputs a pulse signal with a pulse width corresponding to the intensity of the environmental light. Upon receiving the pulse signal, the light intensity detecting device 1 detects light intensity.

Specifically, the light intensity detecting device 1 detects that the pulse signal is raised up via a rising detecting unit 22 (step S101). Next, a counter 24 is activated to count with a unit of an oscillating frequency of a clock generator 20 (such as 10 MHz) for measuring an elapsed time period of the raised pulse signal (step S102).

A sampling unit 14 directs a signal state discriminating unit 12 to obtain a state (H/L) of the pulse signal at a predetermined sampling interval. Each time the signal state discriminating unit 12 is directed by the sampling unit 14, the signal state discriminating unit 12 obtains the state (H/L) of the pulse signal output from the light sensor 2 (step S103). Further, the sampling unit 14 directs the signal state discriminating unit 12 to obtain the state of the pulse signal according to a sampling interval, wherein the number of times for obtaining the pulse signal is also counted (step S104).

A falling detecting unit 16 determines whether the states of the pulse signal are sequentially obtained as "HLL" through the signal state discriminating unit 12 (step S105).

It is assumed that the states of the pulse signal sequentially obtained and be those other than "HLL". In such as case, the sampling unit 14 determines whether a predetermined time period has been elapsed according a counting value of the counter 24 (step S106). When the predetermined time period has not been elapsed, the sampling unit 14 directs the signal state discriminating unit 12 to obtain the state (H/L) of the pulse signal at the same sampling interval (step S103). Moreover, when the predetermined time period has been elapsed, the sampling interval is adjusted according to the predetermined time period (step S107). Meanwhile, the count number of times for the signal state discriminating unit 12 obtaining the state of the pulse signal at the sampling interval, which has not been adjusted, is reset (step S108). Afterward, the sampling unit 14 directs the signal state discriminating unit 12 to obtain the state (H/L) of the pulse signal at the adjusted sampling interval (step S103).

Moreover, if the states of the pulse signal sequentially obtained are "HLL" (step S105), it means that the falling detecting unit 16 detects the pulse signal that has been fallen (step S109).

When the fallen pulse signal is detected, the sampling unit 14 determines a time point T1, which is output as the pulse duration of the pulse signal, for directing the signal state discriminating unit 12 to obtain the state of the pulse signal according to the sampling interval 1/f, the elapsed time period t from the raised pulse signal corresponding to the sampling interval, and the count for the signal state discriminating unit 12 obtains the states of the pulse signal at the sampling interval (step S110).

Following, a sampling correcting unit 18 multiplies the reciprocal of the time point T1 and a predetermined constant for correcting the time point T1 (step S111).

Finally, the corrected time point T1 is used as light intensity information being output from the light intensity detecting device 1 to an illumination adjusting unit 3 (step S112).

Based on the above-mentioned operation, the light intensity detecting device 1 of the invention is capable of detecting light intensity without being affected by noise according to the pulse duration of the pulse signal output from the light sensor 2.

Figure 5:
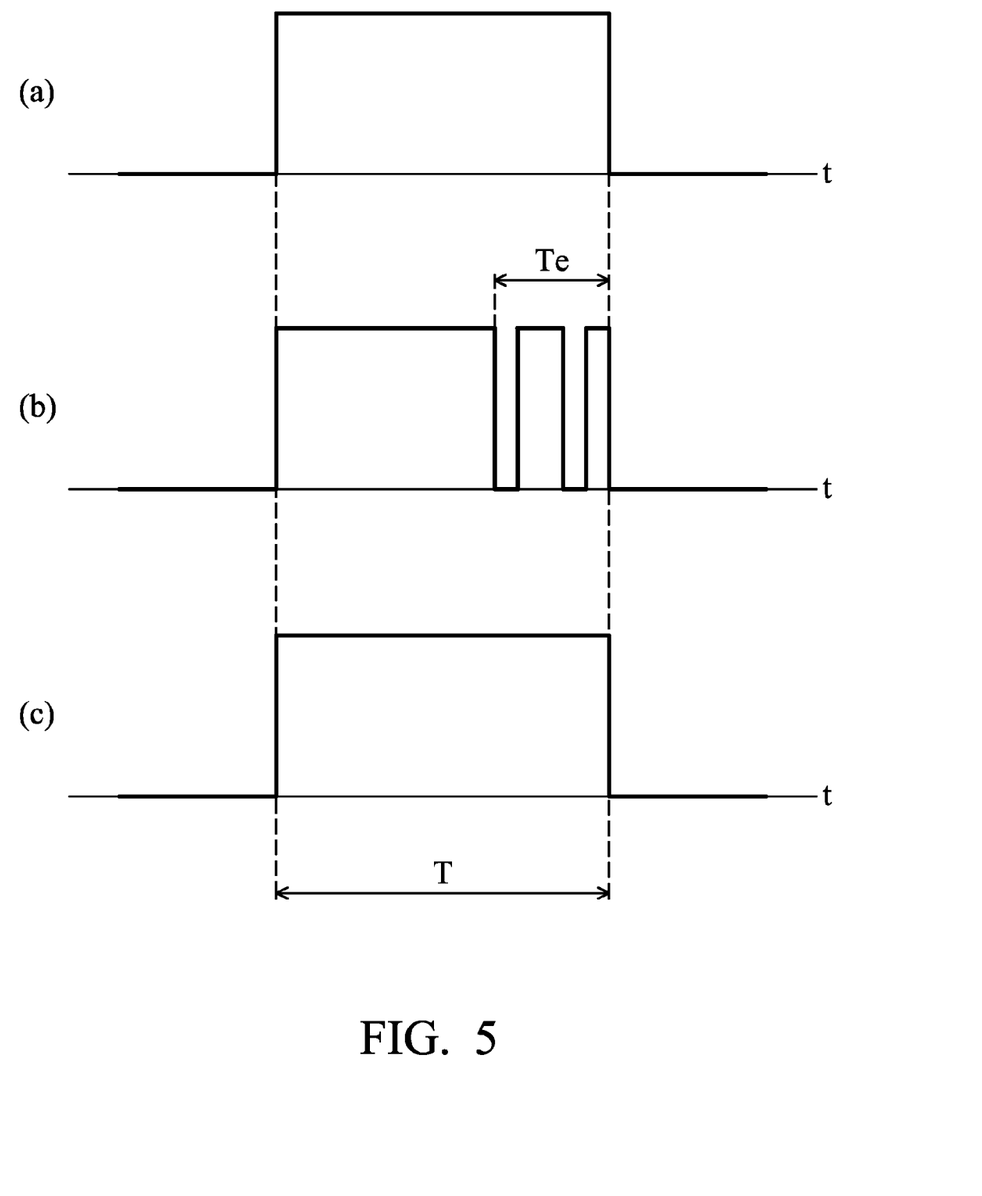
FIG. 5 illustrates pulse duration of a pulse signal detected by a light intensity detecting device, detecting a light intensity according to the invention.

FIGS. 5(*a*) and 5(*b*) are waveform diagrams illustrating an actual pulse signal respectively output from a light sensor without and with being affected by noise. In both cases, the pulse duration of the pulse signal is T. As described above, the pulse duration of the pulse signal output from the light sensor becomes shorter when an environmental light is brighter and becomes longer when the environmental light is darker and the light sensor receives a weak light intensity when the environmental light is darker, thereby easily being affected by noise. FIG. 5(*b*) illustrates a waveform of the pulse signal output from the light sensor. As the environmental light is darker, the pulse duration of the pulse signal output from the light sensor is relatively longer. Thus, the error period Te is ignored according to the prior art. And, the environmental light intensity is determined according to the remaining period (T−Te). However, as shown in FIG. 5(*c*), because the actual fallen state of the pulse signal can be distinguished from and the error fallen state, the pulse duration of the entire pulse signal is able to be measured, including the error period Te.

Furthermore, assuming that the states of the pulse signal are sequentially obtained as "HLL" according to the light intensity detecting device of the invention, since a time point T1 to obtain a low state (L) is provided as the pulse duration of the pulse signal, the actual pulse duration T of the pulse signal is unable to be obtained precisely. The maximum error between the time point T1 and the actual pulse duration T of the pulse signal is 2×(1/f) second. In this case, even if such an error exists, because the reciprocal of the time T1 is utilized, the detecting accuracy of the invention is higher than the prior art, which ignores the error period Te.

Figure 6:
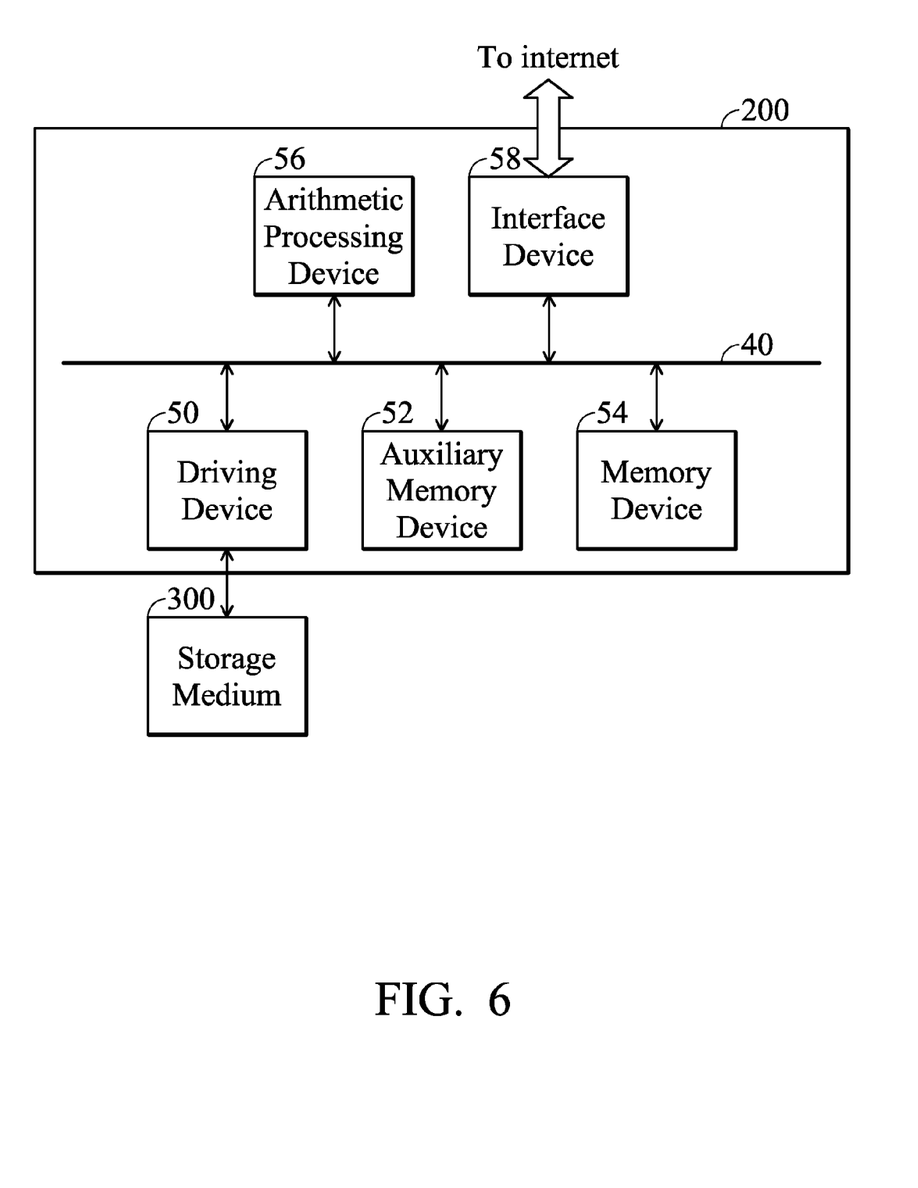
FIG. 6 is a block diagram illustrating a computer for performing a light intensity detecting program according to the invention.

From the aforementioned description, the light intensity detecting device, detecting a light intensity according to the invention within a display device is mainly illustrated as an example in the form of a hardware having a circuit. Additionally, the invention may also be accomplished through a computer that performs a program stored in a memory within a computer-readable storage medium, such as a hard disk drive (HDD), a read-only memory (ROM) or a compact disk (CD). For example, FIG. 6 is a block diagram illustrating a computer for performing a light intensity detecting program according to the invention. Referring to FIG. 6, a computer 200 comprises a driving device 50, an auxiliary memory device 52, a memory device 54, an arithmetic processing device 56 (such as a microprocessor) and an interface device 58, each of which being connected via a bus 40.

The driving device 50 is a device for reading a storage medium 300. A program for performing relative processing in the computer 200 (i.e. a light intensity detecting program) is stored in the storage medium 300. When the storage medium 300 is connected to the driving device 50, the program in the storage medium 300 is installed in the auxiliary memory device 52 via the driving device 50.

The interface device 58 is a device for connecting the computer and an external network. Through the external network, the computer 200 is able to fetch the program from a server or the internet. Otherwise, the program is stored in an embedded memory within the computer 200. The auxiliary memory device 52 is a device for storing a program being installed or fetched from the internet, as well as for storing required files and data.

When the program is activated, the memory device 54 is a device for fetching and storing the program from the auxiliary memory device 52. The arithmetic processing device 56 is a device for performing the function of the program stored within the memory device 54 of the computer 200.

Further, the arithmetic processing device 56 may also be a specific semiconductor chip for performing light intensity detection of the invention. In this case, the arithmetic processing device 56 performs the program stored in an internal or external memory for the operation of detecting light intensity.

As a result, the program uses the computer to perform the light intensity detecting method, detecting a light intensity according to the invention.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A light intensity detecting device, detecting a light intensity according to pulse duration of a pulse signal output from a light sensor, comprising:
    a time measuring unit for measuring an elapsed time period of the pulse signal that has been raised;
    a signal state discriminating unit for obtaining a state of the pulse signal;
    a sampling unit for directing the signal state discriminating unit to obtain the state of the pulse signal at a sampling interval, wherein the sampling interval corresponds to the elapsed time period of the raised pulse signal measured by the time measuring unit; and
    a falling detecting unit for detecting the pulse signal that has been fallen when the signal state discriminating unit successively obtains a fallen state of the pulse signal for two times,
    wherein when the falling detecting unit detects the fallen pulse signal, the sampling unit directs the signal state discriminating unit to obtain the state of the pulse signal at a time point and outputs the time point as the pulse duration of the pulse signal.

2. The device as claimed in claim 1, wherein the sampling unit comprises a mapping table for the elapsed time period of the raised pulse signal and the sampling interval, wherein the sampling interval changes according to the elapsed time period being measured by the time measuring unit.

3. The device as claimed in claim 1, wherein the sampling unit directs the signal state discriminating unit to obtain the state of the pulse signal at the time point according to the sampling interval, the elapsed time period of the raised pulse signal corresponding to the sampling interval, and a count for the signal state discriminating unit obtaining the state of the pulse signal at the sampling interval.

4. The device as claimed in claim 1, further comprising:
    a correcting unit for multiplying a reciprocal of the pulse duration of the pulse signal output from the sampling unit with a predetermined constant to correct the pulse duration of the pulse signal.

5. The device as claimed in claim 4, wherein the predetermined constant is provided for adjusting a resolution.

6. The device as claimed in claim 1, wherein the falling detecting unit comprises:
    a signal state memory unit for storing at least a first previous state and a second previous state preceding the first previous state of the pulse signal which is obtained by the signal state discriminating unit.

7. The device as claimed in claim 1, wherein the time measuring unit comprises:
    a clock generator, oscillating with a predetermined clock frequency;
    a rising detecting unit for detecting the raised pulse signal; and
    a counter, activated to count the clock of the clock generator upon detecting the raised pulse signal of the rising detecting unit.

8. A display device with the light intensity detecting device as claimed in claim 1.

9. A light intensity detecting method, detecting a light intensity according to pulse duration of a pulse signal output from a light sensor, comprising:
    measuring with a time measuring unit an elapsed time period of the pulse signal that has been raised;
    obtaining with a signal state discriminating unit a state of the pulse signal at a sampling interval, wherein the sampling interval corresponds to the elapsed time period of the raised pulse signal;
    detecting with a falling detecting unit the pulse signal that has been fallen when a fallen state of the pulse signal is successively obtained by the signal state discriminating unit for two times; and
    outputting with the sampling unit a time point as the pulse duration of the pulse signal, wherein the state of the pulse signal is obtained by the signal state discriminating unit at the time point in response to detecting the fallen pulse signal by the falling detecting unit.

10. The method as claimed in claim 9, wherein the sampling interval changes according to the elapsed time period being measured.

11. The method as claimed in claim 9, wherein a time point for obtaining the state of the pulse signal is determined according to the sampling interval, the elapsed time period of the raised pulse signal corresponding to the sampling interval, and a count for obtaining the state of the pulse signal at the sampling interval.

12. The method as claimed in claim 9, further comprising:
    multiplying a reciprocal of the pulse duration of the output pulse signal with a predetermined constant for correcting the pulse duration of the pulse signal.

13. The method as claimed in claim 12, wherein the predetermined constant is provided for adjusting a resolution.

14. A computer-readable storage medium for storing a light intensity detecting program, wherein the light intensity detecting program operates a light intensity detecting device to detect the light intensity according to pulse duration of a pulse signal output from a light sensor, and the light intensity detecting program comprises using the light intensity detecting device to perform the steps of:

measuring with a time measuring unit an elapsed time period of the pulse signal that has been raised;

obtaining with a signal state discriminating unit a state of the pulse signal at a sampling interval, wherein the sampling interval corresponds to the elapsed time period of the raised pulse signal;

detecting with a falling detecting unit the pulse signal that has been fallen upon successively obtaining by the signal state discriminating unit a fallen state of the pulse signal for two times; and outputting with the sampling unit a time point as the pulse duration of the pulse signal, wherein the state of the pulse signal is obtained by the signal state discriminating unit at the time point in response to detecting the fallen pulse signal by the falling detecting unit.

15. The computer-readable storage medium as claimed in claim 14, wherein the light intensity detecting program further comprises using the light intensity detecting device to change the sampling interval according to the elapsed time period being measured.

16. The computer-readable storage medium as claimed in claim 14, wherein a time point for obtaining the state of the pulse signal is determined according to the sampling interval, the elapsed time period of the raised pulse signal corresponding to the sampling interval, and a count for obtaining the state of the pulse signal at the sampling interval.

17. The computer-readable storage medium as claimed in claim 14, wherein the light intensity detecting program further comprises using the light intensity detecting device to perform the steps of:

multiplying a reciprocal of the pulse duration of the output pulse signal with a predetermined constant for correcting the pulse duration of the pulse signal.

18. The computer-readable storage medium as claimed in claim 17, wherein the predetermined constant is provided for adjusting a resolution.

* * * * *